United States Patent [19]

Hoch et al.

[11] 4,159,973

[45] Jul. 3, 1979

[54] STABILIZER SYSTEMS AND VINYL HALIDE RESIN COMPOSITIONS CONTAINING SAME

[75] Inventors: Samuel Hoch, Brooklyn, N.Y.; Robert E. Lally, Englishtown, N.J.; Mario Q. Ceprini, Cedarhurst, N.Y.

[73] Assignee: Tenneco Chemicals, Inc., Saddle Brook, N.J.

[21] Appl. No.: 883,964

[22] Filed: Mar. 6, 1978

[51] Int. Cl.² ............... C08F 14/06; C08K 5/50; C08L 27/06

[52] U.S. Cl. ................. 260/23 XA; 252/34; 252/42.7; 260/45.75 R; 260/45.75 W; 260/45.75 K; 260/414

[58] Field of Search ............ 260/23 XA, 45.75 R, 260/45.75 W, 45.75 K, 414; 252/34, 42.7

[56] References Cited

U.S. PATENT DOCUMENTS

| | | | |
|---|---|---|---|
| 2,616,904 | 11/1952 | Asseff et al. | 252/33 |
| 2,617,049 | 11/1952 | Asseff et al. | 252/42.7 |
| 2,781,403 | 2/1957 | Kane et al. | 260/429.7 |
| 2,968,642 | 1/1961 | Le Suer | 260/45.7 R |
| 3,031,284 | 4/1962 | Andress | 252/33 |
| 3,533,975 | 10/1970 | Scullin | 260/45.95 R |
| 3,969,469 | 7/1976 | Love | 260/23 XA |

*Primary Examiner*—Ronald W. Griffin
*Attorney, Agent, or Firm*—Evelyn Berlow

[57] ABSTRACT

Stabilizer systems for vinyl halide resin compositions comprise (a) a liquid, oil-soluble, epoxidized vegetable oil-compatible overbased barium salt complex that is the product obtained by contacting a reaction mixture that consists essentially of a basic barium compound, an alkylphenol, and an inert liquid organic diluent, in the amounts of at least 0.75 mole of alkylphenol per mole of barium compound and 10% to 50% by weight of the diluent, based on the weight of the reaction mixture, with carbon dioxide while the reaction mixture is maintained at a temperature of at least 180° C.;

(b) a polyvalent metal salt component;
(c) an organic phosphite component; and
(d) a hydrocarbon solvent in the amounts of 0.1 part to 5 parts by weight of the polyvalent metal salt component, 0.1 part to 5 parts by weight of the organic phosphite component, and 0.1 part to 5 parts by weight of the hydrocarbon solvent per part by weight of the overbased barium salt complex.

These stabilizer systems are compatible with epoxidized vegetable oils and form stable mixtures with such oils.

30 Claims, No Drawings

STABILIZER SYSTEMS AND VINYL HALIDE RESIN COMPOSITIONS CONTAINING SAME

This invention relates to stabilizer systems for vinyl chloride resin compositions and to resinous compositions stabilized therewith. More particularly, it relates to vinyl chloride resin compositions that contain epoxidized vegetable oil-compatible stabilizer systems that comprise an epoxidized vegetable oil-compatible overbased barium salt complex, a polyvalent metal salt component, and an organic phosphite component.

When vinyl halide resins are exposed to elevated temperatures during their compounding and fabrication, they undergo deterioration and discoloration. Among the many stabilizer systems that have been used to inhibit or prevent this deterioration are those that contain oil-soluble salts of such metals as barium, cadmium, zinc, zirconium, tin, calcium, and strontium in combination with an organic phosphite. These stabilizer systems generally contain an auxiliary stabilizer that is an epoxidized vegetable oil, epoxidized fatty acids, or an ester of epoxidized fatty acids, such as epoxidized soybean oil, epoxidized tall oil, and butyl epoxystearate.

In the commercial use of stabilizer systems for vinyl halide resins, it has become common practice to facilitate their handling and storage by blending the liquid stabilizer systems that comprise oil-soluble salts of polyvalent metals and organic phosphites with the auxiliary stabilizers that are epoxidized soybean oils, epoxidized fatty acids, or epoxidized fatty acid esters for use as needed.

The polyvalent metal component of the stabilizer systems usually contains a barium compound which may be a salt of a monocarboxylic acid such as octanoic acid, neodecanoic acid, or naphthenic acid; a salt of an alkylphenol such as octylphenol or nonylphenol; or an overbased barium salt complex. The overbased barium salt complexes have in recent years gained considerable acceptance in the stabilizer field because overbasing allows the introduction of high barium levels, e.g., 21 to 28% Ba, into the barium component and this permits greater flexibility in the formulation of stabilizers. The use of the overbased barium salt complexes also results in a significant reduction in the cost of the stabilizers by lowering the anion level and by increasing productivity.

Overbased barium salt complexes and their use in stabilizer systems are well known. The preparation of overbased barium salt complexes from carboxylic acids, sulfonic acids, and alkylphenols, using an acidic gas such as $CO_2$ or $SO_2$ to reduce basicity is disclosed in a number of U.S. patents including the following: U.S. Pat. Nos. 2,616,904; 2,760,970; 3,031,284; 2,616,905; 2,767,164; 3,147,232; 2,616,906; 2,777,874; 3,194,823; 2,616,924; 2,781,403; 3,256,186; 2,616,925; 2,798,852; 3,274,135; 2,617,049; 2,802,816; 3,282,835; 2,695,910; 2,959,551; 3,342,733; 2,723,234; 2,968,642; 3,372,114; 2,723,235; 2,971,014; 3,533,975; 2,723,236; 3,027,325; 3,779,922.

A group of overbased barium salt complexes that when used in combination with a cadmium salt or a cadmium salt and zinc salt costabilizer provide vinyl halide resin compositions that are characterized by good initial color and excellent long term heat stability are overbased barium alkylphenate complexes that contain 21% to 28% Ba. The preparation of such complexes is disclosed in the following U.S. patents: U.S. Pat. Nos. 2,616,904; 2,968,642; 3,773,664; 2,959,551; 3,553,975; 3,779,922. In each of the processes disclosed in these patents, a basic barium compound is reacted with an alkylphenol and a promoter that may be an aliphatic alcohol, a nitrated aliphatic hydrocarbon, or an amine and/or a stabilizing agent that is, for example, a polyisobutenyl-substituted succinic anhydride, and the resulting mixture is treated with an acidic gas to reduce its basicity. In each case, the ratio of alkylated phenol to basic barium compound that is used is about 0.1 to 0.5:1. While these overbased barium alkylphenate complexes are effective stabilizers for vinyl halide resins, they are incompatible with epoxidized soybean oil and other epoxidized vegetable oils. When they are combined, for example, with conventional oil-soluble cadmium and zinc salts and organic phosphites and the resulting stabilizer system is blended with an epoxidized vegetable oil, the resulting blend quickly becomes cloudy as the incompatible components precipitate from it. Because they are not homogeneous, such blends present handling and storage problems.

In accordance with this invention, it has been found that stabilizer systems for vinyl halide resin compositions that are compatible with epoxidized vegetable oils and that form stable mixtures with such oils result when certain liquid, oil-soluble, epoxidized vegetable oil-compatible, overbased barium salt complexes are combined with a polyvalent metal salt component, an organic phosphite component, and a hydrocarbon solvent. These stabilizer systems are non-viscous liquids that are convenient to handle and that can be readily incorporated into resinous compositions. Vinyl halide resin compositions that contain these stabilizer systems are characterized by excellent heat and light stability, color, and clarity and little tendency to plate-out.

The liquid, oil-soluble, epoxidized vegetable oil-compatible overbased barium salt complexes that are an essential component of the stabilizer systems of this invention are the products obtained by forming a reaction mixture that consists essentially of a basic barium compound, an alkylphenol, and an inert organic diluent and that contains at least 0.75 mole of alkylphenol per mole of the barium compound and maintaining this reaction mixture at a temperature of at least 180° C. while treating it with an acidic gas, such as carbon dioxide, until the product is substantially neutral. Excellent results have been obtained using a reaction mixture that contained 0.85 mole or more alkylphenol per mole of the barium compound and maintaining the reaction mixture at a temperature in the range of 185° C. to 250° C. during its neutralization with carbon dioxide. The reaction products are then filtered, preferably at approximately the temperature that was maintained during the carbonation reaction.

The basic barium compounds that can be used in the preparation of the novel overbased barium salt complexes include barium oxide, barium hydroxide, hydrated barium hydroxides, barium hydrosulfide, barium sulfide, barium lower alkoxides, and the like and mixtures thereof. The basic barium compound is preferably barium oxide, barium hydroxide, or a hydrated barium hydroxide.

The alkylphenols that can be used in the process of this invention are alkylated monophenols having 1 to 3 alkyl groups, each of which has from 8 to 12 carbon atoms, for example, n-octylphenol, 2-ethylhexylphenol, dodecylphenol, di-n-octylphenol, didecylphenol, didodecylphenol, trioctylphenol, and the like. Preferably a monoalkylphenol having 8 to 10 carbon atoms, such as n-octylphenol, nonylphenol, or decylphenol, is used.

The reaction between the basic barium compound and the alkylphenol is carried out in the presence of at least one substantially inert liquid organic diluent that is compatible with both the alkylphenol and the overbased barium salt complex. The diluent ordinarily comprises about 10% to 50% by weight, and preferably 20% to 30% by weight, of the total weight of the reaction mixture before the mixture is contacted with carbon dioxide. Suitable diluents include such aliphatic, cycloaliphatic, and aromatic hydrocarbons as mineral oils, mineral spirits, kerosene, xylene, cumene, chlorobenzenes, fluorobenzenes, cyclohexane, octane, nonane, decane, and mixtures thereof. The preferred diluents are mineral oils and mixtures of mineral oils with other diluents that are soluble in mineral oil and less viscous than mineral oil, such as toluene or xylene. Particularly good results have been obtained using as inert diluent a mineral oil having a boiling range between 260° C. and 400° C., for example, a mineral oil with a boiling range of 360°–385° C. and a paraffinic-base oil of the mineral seal oil type (Exxon's Mentor 28) having a boiling range of 260°–320° C.

In addition to the novel overbased barium salt complexes, the stabilizer systems of this invention contain a polyvalent metal salt component, an organic phosphite component, and a hydrocarbon solvent.

The polyvalent metal salt component contains at least one polyvalent metal salt of an aliphatic or benzenoid monocarboxylic acid. The useful aliphatic acids are straight-chain and branched-chain alkanoic acids having from 2 to 22 carbon atoms and preferably from 6 to 12 carbon atoms. Illustrative of the preferred aliphatic acids are caproic acid, 2-ethylhexanoic acid, caprylic acid, neooctanoic acid and neodecanoic acid. The benzenoid monocarboxylic acids that can be used are benzoic acid and substituted benzoic acids, the preferred substituted benzoic acids being toluic acids, tert.butylbenzoic acids, chlorobenzoic acids, bromobenzoic acids, and hydroxybenzoic acids. A single acid or a mixture of monocarboxylic acids may be used. The polyvalent metal salts may be salts of cadmium, zinc, zirconium, tin, calcium, strontium, or mixtures thereof, the preferred salts being cadmium salts and mixtures of cadmium and zinc salts.

The organic phosphite component of the stabilizer systems may include a wide variety of substituted and unsubstituted aliphatic and aromatic phosphites. They may be secondary phosphites, such as diaryl phosphites, aryl alkyl phosphites, and dialkyl phosphites, or tertiary phosphites, such as trialkyl phosphites, triaryl phosphites, dialkyl monoaryl phosphites, and monoalkyl diaryl phosphites. Also useful are cyclic phosphites derived from pentaerythritol and other neopentyl polyhydric alcohols. A preferred group of phosphites are the trialkyl, triaryl, dialkyl monoaryl, and monoalkyl diaryl phosphites in which the alkyl groups are straight-chain or branched-chain groups having from 3 to 18 carbon atoms and preferably from 4 to 10 carbon atoms and the aryl groups are phenyl groups or substituted phenyl groups in which the substituents are halogen, hydroxyl groups, or alkyl groups having from 1 to 12 carbon atoms. Illustrative of these organic phosphites are the following: triphenyl phosphite, tri-(p-tert.butylphenyl)phosphite, tri-(hydroxyphenyl)phosphite, diphenyl phosphite, diphenyl dodecyl phosphite, phenyl di-2-ethylhexyl phosphite, phenyl didecyl phosphite, di-(nonylphenyl) 2-chloroethyl phosphite, tridodecyl phosphite, trioctadecyl phosphite, and the like. Another preferred group of phosphites are the secondary phosphites that contain the aforementioned aryl and/or alkyl groups. These include, for example, diphenyl hydrogen phosphite, di(chlorophenyl) hydrogen phosphite, octaphenyl octyl hydrogen phosphite, phenyl decyl hydrogen phosphite, phenyl octadecyl hydrogen phosphite, di-2-ethylhexyl phosphite, and hexyl decyl phosphite. A single phosphite or a mixture of two or more of these compounds may be used.

The solvent that is used in combination with the overbased barium salt complex, polyvalent metal salt component, and organic phosphite component is usually an aliphatic or aromatic hydrocarbon, for example, benzene, toluene, xylene, mineral spirits, kerosene, and naphtha.

The stabilizer systems of this invention generally contain from 0.1 part to 5 parts by weight of the polyvalent metal salt component, 0.1 part to 5 parts by weight of the organic phosphite component, and 0.1 part to 5 parts by weight of solvent per part by weight of the overbased barium salt complex. The preferred stabilizer systems contain 1 part to 2 parts by weight of the polyvalent metal salt component, 1 part to 2 parts by weight of the organic phosphite component, and 0.8 part to 3 parts by weight of solvent per part by weight of the overbased barium salt complex.

In addition to the aforementioned components, the stabilizer systems may contain other heat and light stabilizers such as organotin compounds, polyvalent metal phenates, phenolic compounds, and polyhydric alcohols, antioxidants, lubricants, peptizing agents, and other additives that are ordinarily employed in the production of stabilizers for vinyl halide resin compositions.

Only a small amount of one of these liquid stabilizer systems need be incorporated into vinyl halide resin compositions to impart heat and light stability to them. As little as 0.2% of one of these stabilizer systems, based on the weight of the vinyl halide resin, will bring about an appreciable improvement in the heat stability of the compositions. Five percent or more of the stabilizer systems can be used, but these larger amounts generally do not provide further improvement in the properties of the resinous compositions and for this reason are not ordinarily used. In most cases, from 0.3% to 3% by weight, based on the weight of the vinyl halide resin, of the stabilizer system gives the most advantageous results.

The vinyl halide resins that may be present in the stabilized resinous compositions include both vinyl halide homopolymers, such as polyvinyl chloride, polyvinyl bromine, and polyvinylidene chloride, and copolymers formed by the polymerization of a vinyl halide with up to about 30 percent of a comonomer, such as vinyl acetate, vinyl propionate, vinyl butyrate, vinylidene chloride, styrene, ethylene, propylene, ethyl acrylate, methyl methacrylate, acrylic acid, and the like. The invention is also applicable to mixtures containing a major proportion of a vinyl halide resin and a minor proportion of another synthetic resin, such as chlorinated polyethylene, polyacrylate resins, polymethacrylate esters, polyacrylonitrile, and terpolymers of acrylonitrile, butadiene, and styrene. Any of the well-known plasticizers for vinyl halide resins, such as dioctyl phthalate, dibutyl sebacate, tricresyl phosphate, and octyl diphenyl phosphate, can be present in the stabilized compositions.

In addition to the aforementioned ingredients, the stabilized resinous compositions may contain other resin additives, such as pigments, dyes, processing aids, impact modifiers, extenders, and lubricants, in the amounts ordinarily employed for the purposes indicated.

The stabilized vinyl halide resin compositions may be prepared by any suitable and convenient procedure. Such procedures include dry blending with a conventional mixer such as the Henschel blender, mixing on a two or three roll heated mill, and tumbling.

The invention is further illustrated by the following examples. In these examples, all parts are parts by weight and all percentages are percentages by weight.

EXAMPLES 1-6

A series of overbased barium salt complexes were prepared by the following procedure:

A mixture of nonylphenol (hydroxyl value - 249) and mineral seal oil (Exxon's Mentor 28) in a four-necked flask equipped with an agitator, thermometer, Dean-Stark water trap, condenser, and gas inlet tube was agitated and heated to 70° C. During a period of 20-30 minutes, barium hydroxide monohydrate (70.5% Ba) was added to the mixture, and the temperature increased exothermically to 90°-95° C. The reaction mixture was heated at its reflux temperature (115°-117° C.) for one hour before water was removed from it via the Dean-Stark water trap, allowing the temperature to rise to 145°-150° C. When evolution of water had essentially ceased, the reaction mixture was heated and sparged with carbon dioxide at the rate of 500-1000 cc/minute for 1-2 hours while the evolved water was removed. After the addition of filter-aid, the substantially neutral reaction mixture was filtered hot.

Each of the overbased barium salt complexes prepared in this way was a clear, dark amber liquid that was completely compatible with epoxidized soybean oil.

The amounts of the reactants that were used, the temperatures at which the carbonation and filtration were carried out, and the results obtained are set forth in Table I.

For comparative purposes, a series of overbased barium salt complexes were prepared using a mole ratio of nonylphenol/barium hydroxide monohydrate of less than 0.75/1 or a carbonation temperature below 180° C. The amounts of reactants that were used, the temperatures at which the carbonation and filtration were carried out, and the results obtained are set forth in Table I.

Data obtained by IR and NMR analysis of the products of Examples 5 and 6 and Comparative Examples B, C, D, and E indicated that with increased processing temperatures more of the barium phenate species was formed, possibly forming a complex with the colloidal barium carbonate formed at the lower temperatures. No evidence of the formation of barium carboxylate via the Kolbe-Schmitt reaction was observed.

Table I

Preparation of Overbased Barium Salt Complexes

| Ex. No. | Reactants | | | Mole Ratio Nonylphenol/ Barium Hydroxide Monohydrate | Carbonation Temperature (°C.) | Filtration Temperature (°C.) | Product | |
|---|---|---|---|---|---|---|---|---|
| | Nonylphenol (parts) | Barium Hydroxide Monohydrate (parts) | Mineral Seal Oil (parts) | | | | Yield (parts) | % Ba |
| 1 | 175 | 195 | 150 | 0.78/1 | 185-210 | 185-210 | 475 | 27.2 |
| 2 | 191.3 | 195 | 133.7 | 0.85/1 | 185-210 | 185-210 | 479.3 | 27.0 |
| 3 | 202.5 | 195 | 122.5 | 0.90/1 | 185-210 | 185-210 | 479 | 27.1 |
| 4 | 225.0 | 195 | 100 | 1.00/1 | 185-210 | 185-210 | 475.9 | 27.3 |
| 5 | 191.3 | 195 | 133.7 | 0.85/1 | 182 | 182 | 482.9 | 26.8 |
| 6 | 191.3 | 195 | 133.7 | 0.85/1 | 240 | 240 | 479.4 | 26.4 |
| Comp. Ex. | | | | | | | | |
| A | 157.5 | 195 | 167.5 | 0.70/1 | 185-210 | 185-210 | 472.7 | 26.7 |
| B | 191.3 | 195 | 133.7 | 0.85/1 | 160 | 160 | 477.3 | 26.9 |
| C | 191.3 | 195 | 133.7 | 0.85/1 | 166 | 166 | 479.4 | 26.9 |
| D | 191.3 | 195 | 133.7 | 0.85/1 | 171 | 171 | 481.6 | 26.9 |
| E | 191.3 | 195 | 133.7 | 0.85/1 | 177 | 177 | 486.8 | 26.6 |

EXAMPLE 7

Using the procedure described in Examples 1-6, an overbased barium salt complex was prepared by carbonating a reaction mixture prepared from 175 parts (0.78 mole) of nonylphenol, 195 parts (1 mole) of barium hydroxide monohydrate, and 150 grams of mineral oil. The reaction mixture was carbonated for 2 hours at 190°-210° C., and the substantially neutral reaction mixture was filtered at 190°-200° C. There was obtained 467.2 grams of a clear, dark amber, liquid barium salt complex that contained 27.2% of barium and that was completely compatible with epoxidized soybean oil.

EXAMPLE 8

Stabilizer systems were prepared by mixing an overbased barium salt complex with a polyvalent metal salt component, an organic phosphite component, and a hydrocarbon solvent. The overbased barium salt complexes used were the products of Examples 1, 2, 3, 4, and 7, the product of Comparative Example A, and a commercially-available overbased barium phenate complex that contains 27.5% Ba and that is marketed as Lubrizol 2106.

Twenty-four hours after its preparation, each of the stabilizer systems was mixed with an equal weight of epoxidized soybean oil. The mixtures were allowed to stand at room temperature for one month.

The components of the stabilizer systems and the appearance of the stabilizer/epoxidized soybean oil blends initially and after 1 month are set forth in Table II.

Table II

Stabilizer Systems Containing Overbased Barium Salt Complexes

| Component | A | B | C | D | E | F | G |
|---|---|---|---|---|---|---|---|
| Product of Ex. 1 | 20.5 | | | | | | |
| Product of Ex. 2 | | 20.5 | | | | | |
| Product of Ex. 3 | | | 20.5 | | | | |
| Product of Ex. 4 | | | | 20.5 | | | |
| Product of Ex. 7 | | | | | 20.5 | | |
| Product of Comp. Ex. A | | | | | | 20.5 | |
| Commercial Overbased Barium Salt Complex (27.5% Ba) (Lubrizol 2106) | | | | | | | 20.5 |
| Cadmium Benzoate/Cadmium p-tert.butyl-benzoate (12.0% Cd) | 20.0 | 20.0 | 20.0 | 20.0 | 20.0 | 20.0 | 20.0 |
| Zinc Benzoate/Zinc p-tert.butyl-benzoate (10.0% Zn) | 4.8 | 4.8 | 4.8 | 4.8 | 4.8 | 4.8 | 4.8 |
| Phenyl Didecyl Phosphite | 29.0 | 20.0 | 29.0 | 29.0 | 29.0 | 29.0 | 29.0 |
| Phenyl Decyl Hydrogen Phosphite | 7.0 | 7.0 | 7.0 | 7.0 | 7.0 | 7.0 | 7.0 |
| Hi-Flash Naphtha (Boiling Range - 160°-175° C.) | 18.7 | 18.7 | 18.7 | 18.7 | 18.7 | 18.7 | 18.7 |
| Appearance of 1:1 blend of stabilizer system with Epoxidized Soybean Oil | | | | | | | |
| Initial | Clear | Clear | Clear | Clear | Clear | Cloudy | Cloudy |
| After 1 Month | Clear | Clear | Clear | Clear | Clear | Cloudy | Cloudy |

EXAMPLE 9

Stabilizer systems were prepared by mixing an overbased barium salt complex with a polyvalent metal salt component, an organic phosphite component, and a hydrocarbon solvent. The overbased barium salt complexes used were the products of Examples 5 and 6 and the products of Comparative Examples B, C, D, and E.

Twenty-four hours after its preparation, each of the stabilizer systems was mixed with an equal weight of epoxidized soybean oil. The mixtures were allowed to stand at room temperature for one month.

The components of the stabilizer systems and the appearance of the stabilizer/epoxidized soybean oil blends initially and after 1 month are set forth in Table III.

Table III

Stabilizer Systems Containing Overbased Barium Salt Complexes

| Component | H | I | J | K | L | M |
|---|---|---|---|---|---|---|
| Product of Ex. 5 | 15.5 | | | | | |
| Product of Ex. 6 | | 15.5 | | | | |
| Product of Comp. Ex. B | | | 15.5 | | | |
| Product of Comp. Ex. C | | | | 15.5 | | |
| Product of Comp. Ex. D | | | | | 15.5 | |
| Product of Comp. Ex. E | | | | | | 15.5 |
| Cadmium Benzoate/Cadmium p-tert.butyl-benzoate (12.0% Cd) | 16.7 | 16.7 | 16.7 | 16.7 | 16.7 | 16.7 |
| Zinc Benzoate/Zinc p-tert. butyl-benzoate (10.0% Zn) | 5.8 | 5.8 | 5.8 | 5.8 | 5.8 | 5.8 |
| Phenyl Didecyl Phosphite | 18.3 | 18.3 | 18.3 | 18.3 | 18.3 | 18.3 |
| Phenyl Decyl Hydrogen Phosphite | 5.0 | 5.0 | 5.0 | 5.0 | 5.0 | 5.0 |
| Mineral Spirits | 38.7 | 38.7 | 38.7 | 38.7 | 38.7 | 38.7 |
| Appearance of 1:1 blend of stabilizer system with Epoxidized Soybean Oil | | | | | | |
| Initial | Clear | Clear | Cloudy | Cloudy | Cloudy | Sl. Haze |
| After 1 Month | Clear | Clear | Cloudy | Cloudy | Cloudy | Cloudy |

From the data in Tables II and III, it will be seen that all of the stabilizer systems that contained overbased barium salt complexes prepared by the process of this invention, that is, stabilizer systems A-E, H, and I, formed 1:1 blends with epoxidized soybean oil that were clear and that remained clear on storage for 1 month. The stabilizer systems that contained a barium salt complex in which the mole ratio of nonylphenol to barium hydroxide monohydrate was less than 0.75/1 (Stabilizer System F), a barium salt complex that had been prepared at a temperature below 180° C. (Stabilizer Systems J, K, L, and M) or a commercially-available barium salt complex (Stabilizer System G) formed cloudy 1:1 blends with epoxidized soybean oil.

EXAMPLE 10

Stabilized polyvinyl chloride resin compositions were prepared by the following procedure:

To a mixture of 100 parts of polyvinyl chloride, 60 parts of dioctyl phthalate, 20 parts of epoxidized soybean oil, and 0.5 part of stearic acid was added 2 parts of one of the stabilizer systems of this invention or a comparative stabilizer system having one of the compositions set forth in Tables II and III. The resulting mixture was blended at room temperature and then charged to a two-roll, steam-heated differential speed mill whose roll surface temperature was maintained at 165° C. The mixture was milled for 5 minutes and then removed from the mill as a flexible, homogeneous sheet, 0.045 inch in thickness.

When evaluated by standard test methods, all of the polyvinyl chloride compositions were found to have excellent heat and light stability and resistance to plate-out.

What is claimed is:

1. A stabilizer system for vinyl halide resin compositions that comprises
(a) a liquid, oil-soluble, epoxidized-vegetable oil-compatible overbased barium salt complex that is the product obtained by
  (i) forming a reaction mixture that consists essentially of
    (a) a basic barium compound,
    (b) an alkylphenol having from 1 to 3 alkyl groups, each of which has from 8 to 12 carbon atoms, and
    (c) an inert liquid organic diluent,
    in the amounts of at least 0.75 mole of said alkylphenol per mole of said barium compound and 10% to 50% by weight of said diluent, based on the weight of the reaction mixture, and
  (ii) maintaining said reaction mixture at a temperature of at least 180° C. while treating it with carbon dioxide to reduce its basicity;
(b) at least one polyvalent metal salt selected from the group consisting of cadmium, zinc, zirconium, tin, and calcium salts of benzoic acid, alkylbenzoic acids, halobenzoic acids, hydroxybenzoic acids, and alkanoic acids having 2 to 22 carbon atoms;
(c) at least one organic phosphite selected from the group consisting of secondary and tertiary aryl, alkyl, and alkyl aryl phosphites in which the alkyl groups have from 3 to 18 carbon atoms and the aryl groups are phenyl, alkylphenyl, halophenyl, or hydroxyphenyl; and
(d) an aromatic or aliphatic hydrocarbon solvent,
in the amounts of 0.1 part to 5 parts by weight of the polyvalent metal salt component, 0.1 part to 5 parts by weight of the organic phosphite component, and 0.1 part to 5 parts by weight of the hydrocarbon solvent per part by weight of the overbased barium salt complex.

2. A stabilizer system as set forth in claim 1 wherein the overbased barium salt complex is the product obtained by passing carbon dioxide through a reaction mixture that contains at least 0.85 mole of an alkylphenol per mole of said barium compound and 20% to 30% of said diluent, based on the weight of the reaction mixture, while the reaction mixture is maintained at a temperature of at least 180° C.

3. A stabilizer system as set forth in claim 1 wherein the overbased barium salt complex is the product obtained by passing carbon dioxide through a reaction mixture that contains 0.85 mole to 1.0 mole of a monoalkylphenol having 8 to 10 carbon atoms per mole of the barium compound while the reaction mixture is maintained at a temperature in the range of 185° C. to 250° C.

4. A stabilizer system as set forth in claim 1 wherein the alkylphenol used in the preparation of the overbased barium salt complex is nonylphenol.

5. A stabilizer system as set forth in claim 1 wherein the basic barium compound is selected from the group consisting of barium oxide, barium hydroxide, and hydrated barium hydroxide.

6. A stabilizer system as set forth in claim 1 that contains 1 part to 2 parts by weight of the polyvalent metal salt component, 1 part to 2 parts by weight of the organic phosphite component, and 0.8 part to 3 parts by weight of the hydrocarbon solvent per part by weight of the overbased barium salt complex.

7. A stabilizer system as set forth in claim 1 wherein the polyvalent metal salt component is a mixture of cadmium and zinc salts.

8. A stabilizer system as set forth in claim 1 wherein the organic phosphite component is a mixture of secondary and tertiary alkyl aryl phosphites.

9. A heat and light stable resinous composition that comprises a vinyl halide resin and from 0.2 part to 5 parts by weight per 100 parts by weight of said vinyl halide resin of a stabilizer system that comprises
(a) a liquid, oil-soluble, epoxidized-vegetable oil-compatible overbased barium salt complex that is the product obtained by
  (i) forming a reaction mixture that consists essentially of
    (a) a basic barium compound,
    (b) an alkylphenol having from 1 to 3 alkyl groups, each of which has from 8 to 12 carbon atoms, and
    (c) an inert liquid organic diluent,
    in the amounts of at least 0.75 mole of said alkylphenol per mole of the barium compound and 10% to 50% by weight of said solvent, based on the weight of said reaction mixture, and
  (ii) maintaining said reaction mixture at a temperature of at least 180° C. while treating it with carbon dioxide to reduce its basicity;
(b) at least one polyvalent metal salt selected from the group consisting of cadmium, zinc, zirconium, tin, and calcium salts of benzoic acid, alkylbenzoic acids, halobenzoic acids, hydroxybenzoic acids, and alkanoic acids having 2 to 22 carbon atoms;
(c) at least one organic phosphite selected from the group consisting of secondary and tertiary aryl, alkyl, and alkyl aryl phosphites in which the alkyl groups have from 3 to 18 carbon atoms and the aryl groups are phenyl, alkylphenyl, halophenyl, or hydroxyphenyl; and
(d) an aromatic or aliphatic hydrocarbon solvent,
in the amounts of 0.1 part to 5 parts by weight of the polyvalent metal salt component, 0.1 part to 5 parts by weight of the organic phosphite component, and 0.1 part to 5 parts by weight of the hydrocarbon solvent per part by weight of the overbased barium salt complex.

10. A heat and light stable resinous composition as set forth in claim 9 that contains from 0.3 part to 3 parts by weight of said stabilizer system per 100 parts by weight of the vinyl halide resin.

11. A heat and light stable resinous composition as set forth in claim 9 wherein the vinyl halide resin is polyvinyl chloride.

12. A heat and light stable resinous composition as set forth in claim 9 wherein the overbased barium salt complex in the stabilizer system is the product obtained by passing carbon dioxide through a reaction mixture that contains at least 0.85 mole of an alkylphenol per mole of said barium compound and 20% to 30% of said diluent, based on the weight of the reaction mixture, while the reaction mixture is maintained at a temperature of at least 180° C.

13. A heat and light stable resinous composition as set forth in claim 9 wherein the overbased barium salt complex in the stabilizer system is the product obtained by passing carbon dioxide through a reaction mixture that contains 0.85 mole to 1.0 mole of a monoalkylphenol having 8 to 10 carbon atoms per mole of the barium compound while the reaction mixture is maintained at a temperature in the range of 185° C. to 250° C.

14. A heat and light stable resinous composition as set forth in claim 9 wherein the alkylphenol used in the preparation of the overbased barium salt complex component of the stabilizer system is nonylphenol.

15. A heat and light stable resinous composition as set forth in claim 9 wherein the basic barium compound is selected from the group consisting of barium oxide, barium hydroxide, and hydrated barium hydroxide.

16. A heat and light stable resinous composition as set forth in claim 9 wherein the stabilizer system contains 1 part to 2 parts by weight of the polyvalent metal salt component, 1 part to 2 parts by weight of the organic phosphite component, and 0.8 part to 3 parts by weight of the hydrocarbon solvent per part by weight of the overbased barium salt complex.

17. A liquid, oil-soluble, epoxidized-vegetable oil-compatible overbased barium salt complex that is the product obtained by
(a) forming a reaction mixture that consists essentially of
  (i) a basic barium compound,
  (ii) an alkylphenol having from 1 to 3 alkyl groups each of which has from 8 to 12 carbon atoms, and
  (iii) an inert liquid organic diluent,
  in the amounts of at least 0.75 mole of said alkylphenol per mole of said barium compound and 10% to 50%, based on the weight of the reaction mixture, of the diluent, and
(b) maintaining said reaction mixture at a temperature of at least 180° C. while treating it with carbon dioxide to reduce its basicity.

18. A liquid, oil-soluble, epoxidized vegetable oil-compatible overbased barium salt complex as set forth in claim 17 that is the product obtained by passing carbon dioxide through a reaction mixture that contains at least 0.85 mole of an alkylphenol per mole of said barium compound and 20% to 30% by weight of said diluent, based on the weight of said reaction mixture, while the reaction mixture is maintained at a temperature of at least 180° C.

19. A liquid, oil-soluble, epoxidized vegetable oil-compatible overbased barium salt complex as set forth in claim 17 that is the product obtained by passing carbon dioxide through a reaction mixture that contains 0.85 mole to 1.0 mole of a monoalkylphenol having 8 to 10 carbon atoms per mole of said barium compound while the reaction mixture is maintained at a temperature in the range of 185° C. to 250° C.

20. A liquid, oil-soluble, epoxidized vegetable oil-compatible overbased barium salt complex as set forth in claim 17 wherein the alkylphenol in the reaction mixture is nonylphenol.

21. A liquid, oil-soluble, epoxidized vegetable oil-compatible overbased barium salt complex as set forth in claim 17 wherein the basic barium compound in the reaction mixture is selected from the group consisting of barium oxide, barium hydroxide, and hydrated barium hydroxide.

22. A liquid, oil-soluble, epoxidized vegetable oil-compatible overbased barium salt complex as set forth in claim 17 wherein the basic barium compound is barium hydroxide monohydrate.

23. A liquid, oil-soluble, epoxidized vegetable oil-compatible overbased barium salt complex as set forth in claim 17 wherein the inert liquid organic diluent in the reaction mixture is a mineral oil having a boiling range between 260° C. and 400° C.

24. The process for the preparation of a liquid, oil-soluble, epoxidized vegetable oil-compatible overbased barium salt complex that comprises the steps of
(a) forming a reaction mixture that consists essentially of
  (i) a basic barium compound,
  (ii) an alkylphenol having from 1 to 3 alkyl groups each of which has from 8 to 12 carbon atoms, and
  (iii) an inert liquid organic diluent in the amounts of at least 0.75 mole of alkylphenol per mole of said barium compound and 10% to 50%, based on the weight of the reaction mixture, of the inert diluent, and
(b) maintaining said reaction mixture at a temperature of at least 180° C. while treating it with carbon dioxide to reduce its basicity.

25. The process of claim 24 wherein the reaction mixture formed in Step (a) contains at least 0.85 mole of alkylphenol per mole of said barium compound and 20% to 30% by weight of said diluent, based on the weight of the reaction mixture.

26. The process of claim 24 wherein in Step (b) the reaction mixture is maintained at a temperature of at least 185° C. while it is treated with carbon dioxide.

27. The process of claim 24 wherein in Step (b) the reaction mixture is maintained at a temperature in the range of 185° C. to 250° C. while it is treated with carbon dioxide.

28. The process of claim 24 wherein the alkylphenol in the reaction mixture is a monoalkylphenol having 8 to 10 carbon atoms.

29. The process of claim 24 wherein the basic barium compound in the reaction mixture is selected from the group consisting of barium oxide, barium hydroxide, and hydrated barium hydroxide.

30. The process of claim 24 wherein the inert liquid organic diluent in the reaction mixture is a mineral oil having a boiling range between 260° C. and 400° C.

* * * * *